No. 730,580. PATENTED JUNE 9, 1903.
A. L. STANFORD.
FRICTION CLUTCH.
APPLICATION FILED APR. 2, 1903.
NO MODEL.
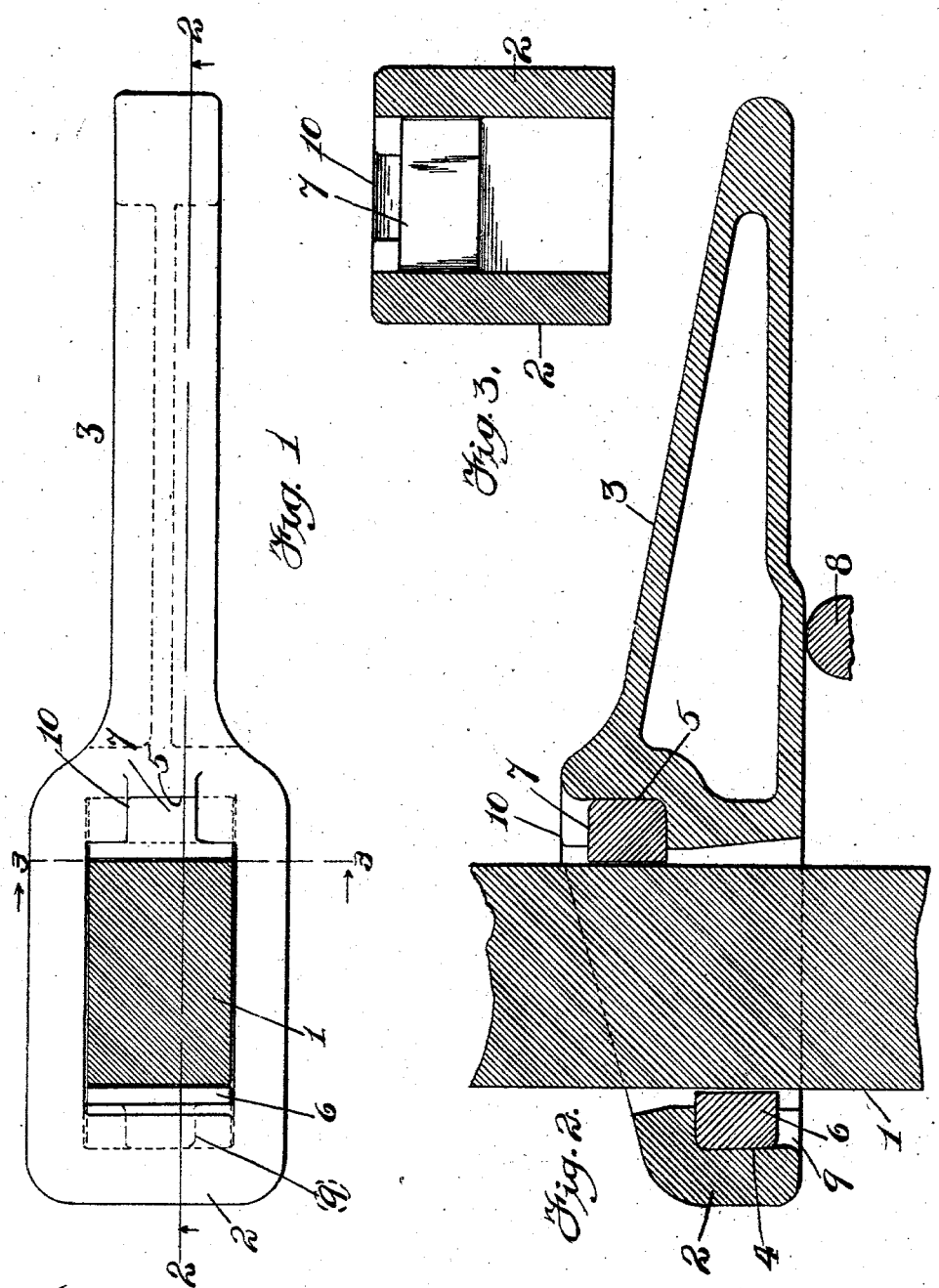

UNITED STATES PATENT OFFICE.

ARTHUR L. STANFORD, OF CHICAGO, ILLINOIS.

FRICTION-CLUTCH.

SPECIFICATION forming part of Letters Patent No. 730,580, dated June 9, 1903.

Application filed April 2, 1903. Serial No. 150,688. (No model.)

*To all whom it may concern:*

Be it known that I, ARTHUR L. STANFORD, a citizen of the United States, residing at Chicago, in the county of Cook and State of Illinois, have invented certain new and useful Improvements in Friction-Clutches, of which the following is a full, clear, and exact specification.

My invention relates more particularly to that class of friction-clutches comprising an oscillatory gripping ring or pawl binding the bar to be clutched on opposite sides; and my invention has for its primary object to provide improved means whereby the gripping-faces of the ring may be equipped with hardened reinforces capable of renewal, if desired, so that when worn beyond usefulness they may be renewed, thus prolonging the life of the ring proper an indefinite length of time.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claims.

In the said drawings, Figure 1 is a plan view of my improved clutch. Fig. 2 is a vertical section thereof on the line 2 2, Fig. 1; and Fig. 3 is a vertical cross-section on the line 3 3, Fig. 1.

1 is the bar to be clutched or gripped and which in reality constitutes a part of the clutch, and 2 is the ring or the pawl, which is shown formed with a lever or handle 3 and through which ring passes the bar 1.

In the inner faces of the ring 2, which is shown rectangular in cross-section, as appears in Fig. 1, on diametrically opposite sides are formed recesses 4 5, respectively, and in these recesses are inserted reinforce-blocks 6 7, respectively, which project preferably entirely across opposite faces of the bar 1 and also protrude from the recesses beyond the opposed faces of the ring 2 a sufficient distance to insure firm contact and an accurate fit against the bar in such a way that when the pawl or ring is deflected with relation to the bar the outer faces of the reinforce-blocks 6 7, which are flat and substantially parallel, will bind against the sides of the bar and grip the same with a pressure proportionate to the weight of the bar or an object supported thereon without permitting the sides of the ring proper to come in contact with the bar or receive any appreciable wear. As shown more clearly in Fig. 1, the dimension of the ring in one direction—*i. e.*, between the faces in which the blocks 6 7 are set—is such that considerable space is left between said faces and the bar; but the blocks 6 7 substantially bridge this space, so as to make a nice fit between the blocks and the bar, whereby the ring will be shielded from direct wearing contact, and at the same time the blocks will be held in place by engagement with the bar and prevented from moving laterally a sufficient distance to become dislodged from their seats or recesses. The other dimension of the ring—*i. e.*, at right angles to that just described—is substantially equal to the width of the bar, as shown in Fig. 1.

In this example of my invention I have illustrated the clutch in a form suitable for supporting the bar 1 against downward movement. In such use the clutch lever or arm 3 would ordinarily be fulcrumed or supported at about the point 8 on any suitable fulcrum or support, so that the tendency of the bar and clutch to move downwardly together will throw the blocks 6 7 against the opposite sides of the bar and cause them to bind. In this form the blocks 6 7 are set diagonally opposite each other, the block 6, which moves downwardly at a greater rate of speed than the block 7, being set lower than the latter.

In order that the reinforce-blocks 6 7 may be readily reset when worn beyond usefulness and it is desired to renew them, the ring 2 on one side of each of the recesses 4 5 is cut away, as shown at 9 10, respectively, the recess 4 being cut away at the bottom and the recess 5 at the top or on the sides opposite that on which the strain is borne. Thus by removing the bar 1 and inserting an instrument in the notches 9 or 10 at the back of the block the latter may be forced out of its seat.

Having thus described my invention, what I claim as new therein, and desire to secure by Letters Patent, is—

1. In a friction-clutch, the combination of a ring member having its inner faces recessed, reinforce-blocks set in said recesses, and a bar fitting accurately between said blocks.

2. In a clutch, the combination of a ring member having its inner faces recessed at points diagonally opposite each other, reinforce-blocks set in said recesses, and a bar fitting between said blocks.

3. In a friction-clutch, the combination of a ring member having its inner faces recessed, reinforce-blocks set in said recesses, and a bar fitting between said blocks, said recesses being each cut away on one side for the admission of a tool behind the block therein.

4. In a friction-clutch, the combination of a ring member having its inner faces recessed, reinforce-blocks set in said recesses, and a bar fitting between said blocks, one of said recesses being notched on its top side and the other on its bottom side for the admission of a tool behind the blocks therein.

ARTHUR L. STANFORD.

Witnesses:
F. A. HOPKINS,
M. B. ALLSTADT.